March 2, 1954  N. WOLOFSKI  2,670,786
SEAT AND BACK CUSHION CONSTRUCTION
Filed Oct. 20, 1948  5 Sheets-Sheet 1
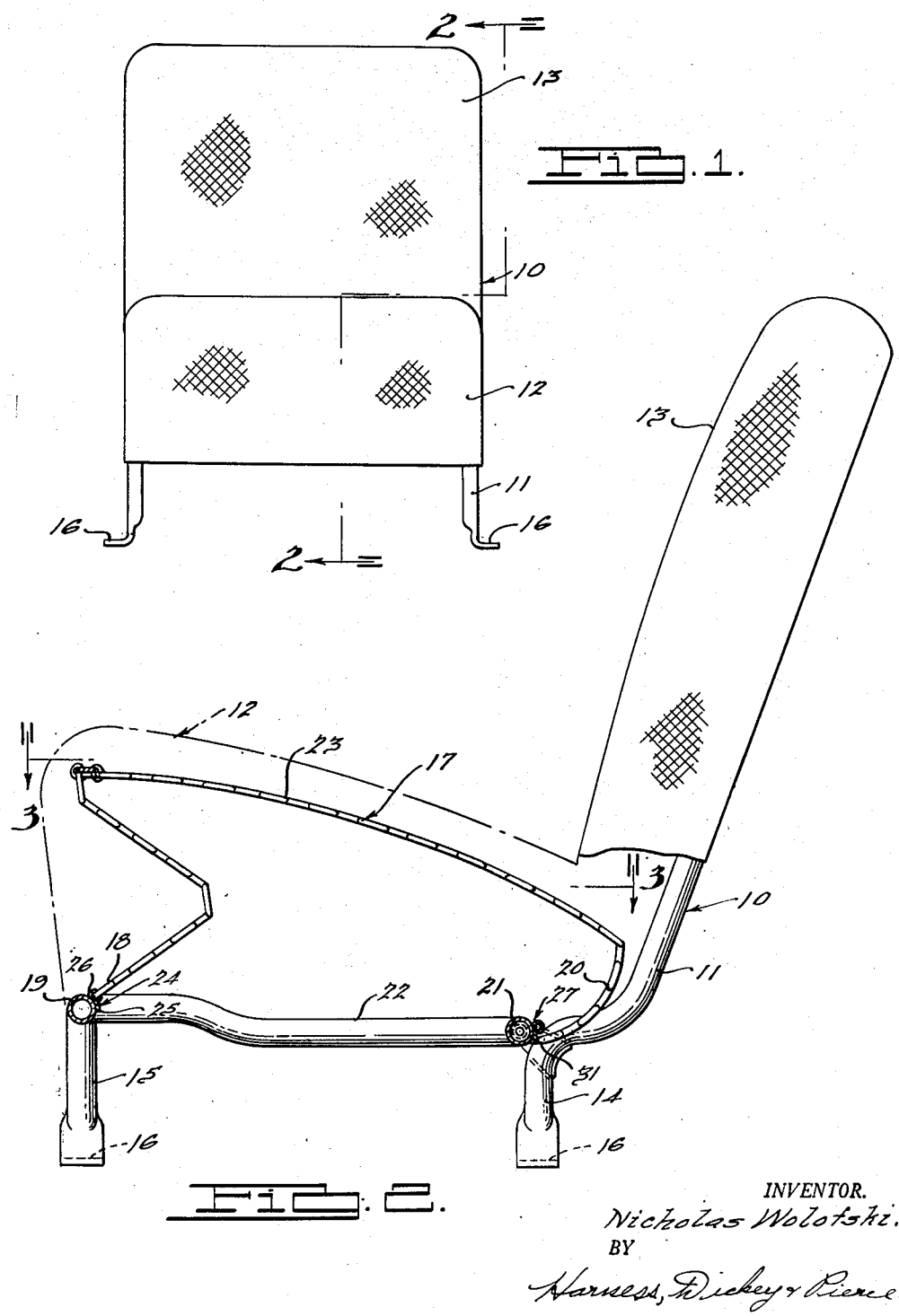

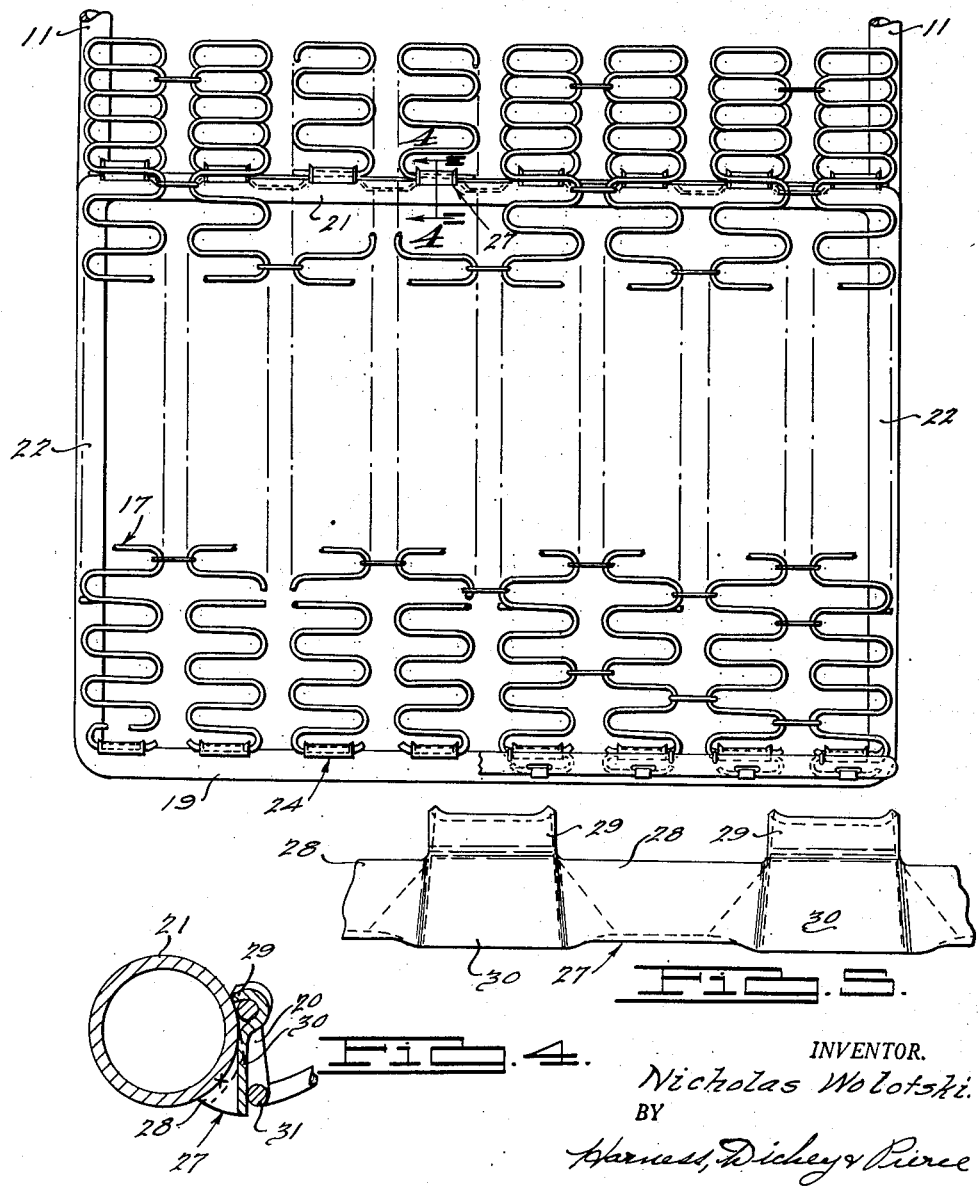

March 2, 1954  N. WOLOFSKI  2,670,786
SEAT AND BACK CUSHION CONSTRUCTION
Filed Oct. 20, 1948  5 Sheets-Sheet 3

INVENTOR.
Nicholas Wolofski.
BY
Harness, Dickey & Pierce
ATTORNEYS.

March 2, 1954 N. WOLOFSKI 2,670,786
SEAT AND BACK CUSHION CONSTRUCTION
Filed Oct. 20, 1948 5 Sheets-Sheet 4
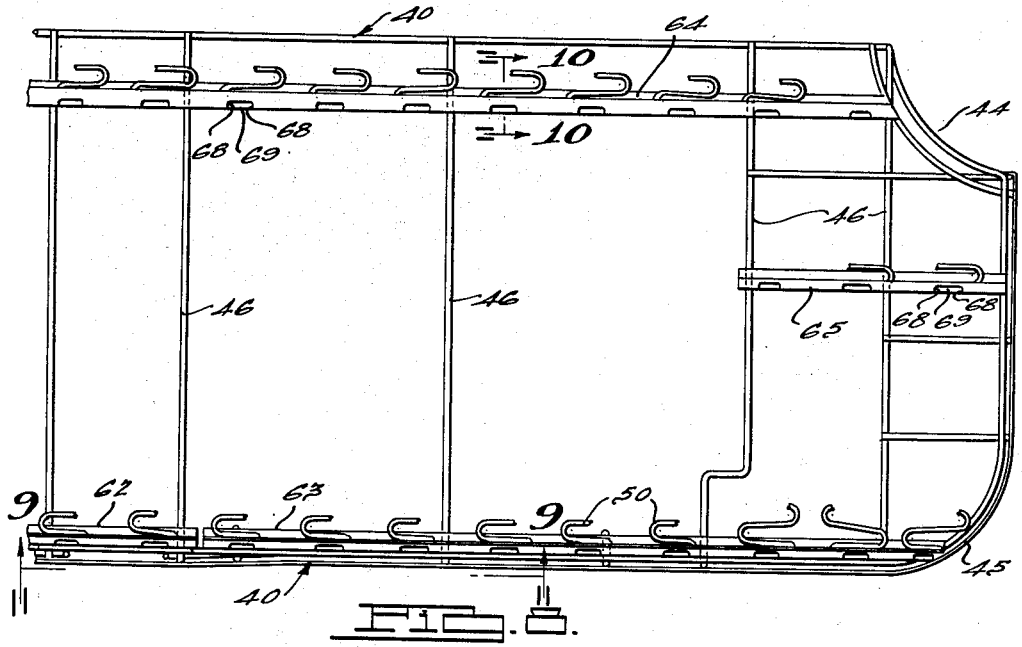
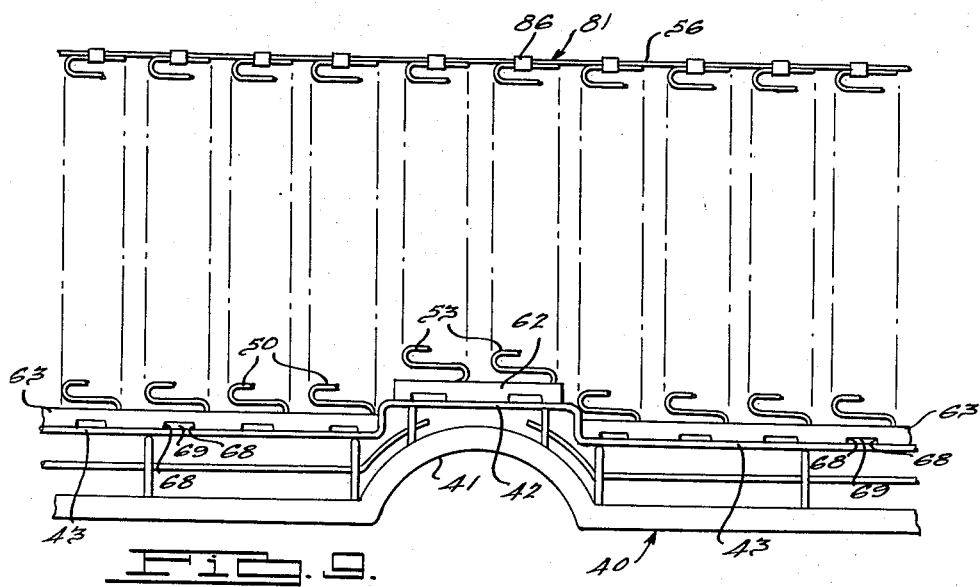
INVENTOR.
Nicholas Wolofski.
BY
Harness, Dickey & Pierce
ATTORNEYS.

March 2, 1954 N. WOLOFSKI 2,670,786
SEAT AND BACK CUSHION CONSTRUCTION
Filed Oct. 20, 1948 5 Sheets-Sheet 5

INVENTOR.
Nicholas Wolofski.
BY
Harness, Dickey & Pierce.
ATTORNEYS.

Patented Mar. 2, 1954

2,670,786

UNITED STATES PATENT OFFICE 2,670,786

SEAT AND BACK CUSHION CONSTRUCTION

Nicholas Wolofski, Detroit, Mich., assignor to The Murray Corporation of America, Detroit, Mich., a corporation of Delaware Application October 20, 1948, Serial No. 55,633

11 Claims. (Cl. 155—179)

This invention relates to the construction of spring cushions and, in particular, refers to units built up from spring strips of predetermined form to provide back and seat constructions for automobiles, chairs, davenports, and the like.

The invention contemplates the use of a plurality of sinuous spring strips similar to those illustrated and described in the Kaden Reissue Patent No. 21,263 under which the assignee of the present application is a licensee. The individual spring strips are preferably formed in accordance with the teachings of the applicant's copending application, Serial No. 16,671, filed March 24, 1948, now Patent No. 2,631,029. Such spring strips have the ends bent in a predetermined manner beneath load-supporting portions to form resilient supports for the resilient surface provided by the plurality of springs.

An important object of the invention is to provide in an assembly of such connecting springs, means whereby undesirable relative movement of the spring strips either individually or severally, is prevented.

Another object of the invention is to provide an assembly of springs of the type referred to, to form a cushion having a "soft edge."

A further object is to provide a spring cushion construction of the type indicated which is inexpensive to manufacture and assemble and which is light and rugged.

The novel structure whereby these and other objects of the invention are accomplished will become apparent upon consideration of the accompanying drawings in which:

Figure 1 is a front elevational view of a seat embodying features of this invention;

Fig. 2 is an enlarged side view partly in section, taken along the line 2—2 of Fig. 1;

Fig. 3 is a sectional view taken along the line 3—3 of Fig. 2;

Fig. 4 is a sectional view taken along the line 4—4 of Fig. 3;

Fig. 5 is a side view of a connecting strip shown in cross-section in Fig. 4;

Fig. 8 is a sectional view of the structure illustrated in Fig. 7, taken on the line 8—8 thereof;

Fig. 9 is a front elevational view of the seat construction of Fig. 6 as taken on line 9—9 of Fig. 8;

Figure 6:
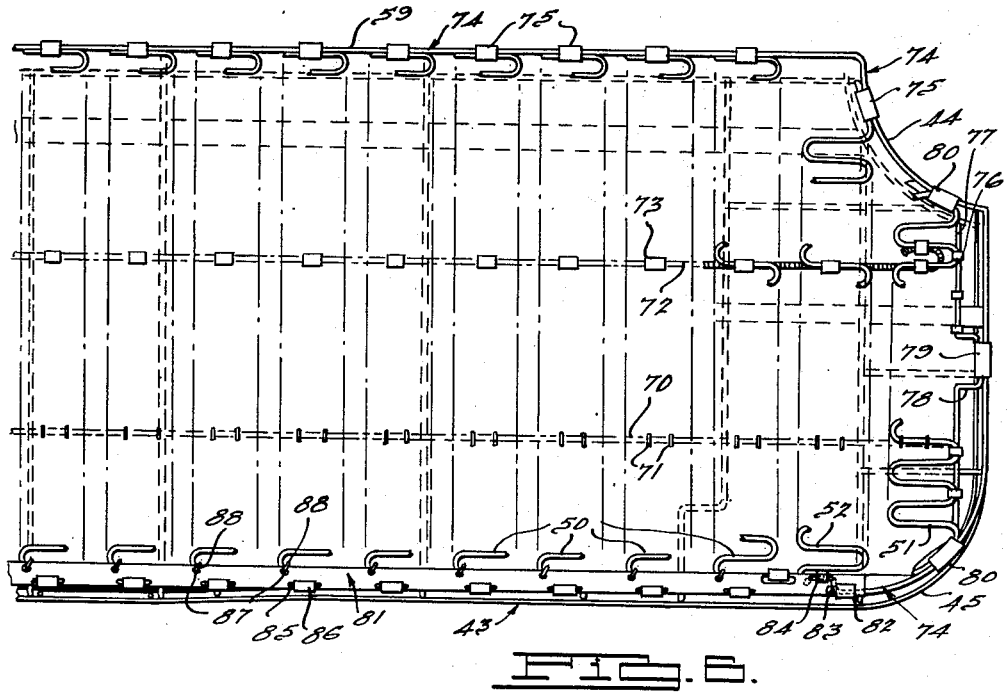
Fig. 6 is a plan view with parts broken away of another form of the invention as applied to a rear seat cushion for an automobile.
Figure 7:
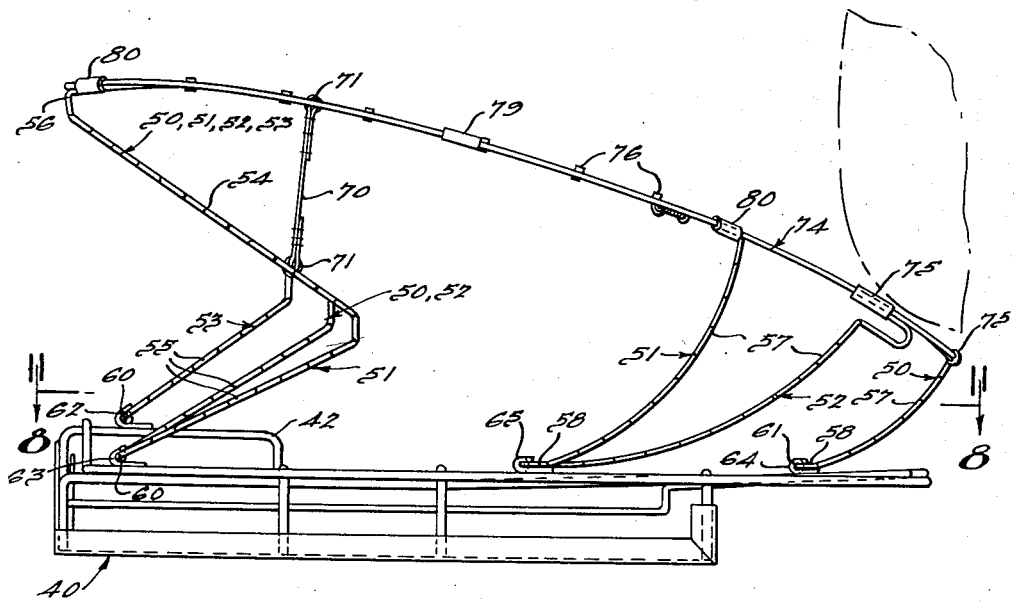
Fig. 7 is a side elevational view taken from the right of Fig. 6.

In the drawings, a seat unit 10 is illustrated comprising a supporting frame 11 having a seat cushion 12 and a back cushion 13 constructed thereon. The supporting frame 11 is of tubular construction having legs 14 and 15 provided with feet 16 by which the legs may be attached in fixed relation to a floor such as that of an automobile.

The seat cushion 12 includes a plurality of parallel sinuous spring elements 17 formed in accordance with the aforementioned copending application. The forward ends 18 of these springs are connected to a transverse tubular rail 19 and the rearward ends 20 to a transverse tubular rail 21. The rails 19 and 21 may be interconnected by side rails 22 and this assembly joined to the legs 14 and 15 in a suitable manner.

As is clearly shown in Fig. 2, the forward end portion 18 of the spring 17 is inclined or curved inwardly and thence outwardly beneath the load-supporting portion 23 of the spring to form an inwardly convex resilient support. The end 18 may be connected in any suitable manner to the tube 19. A preferred connecting means comprises a transverse strip 24 having a contour 25 conforming to the tubular support 19 and fixedly attached thereto as by welding. The strip 24 has transversely spaced forwardly presenting eye portions 26 through which the transverse linear forward ends of the springs 17 extend and are thereby clamped to the tube 19.

The rearward ends 20 of springs 17 are curved or inclined inwardly beneath the load-supporting portion 23 as clearly shown in Fig. 2. They may be attached to the tubular rail 21 by a strip 27, similar to the strip 24, having a contoured flange 28, welded to the tube, and hook portions 29 with which the ends of the springs are engaged (Fig. 4). It is desirable to connect ends 20 to the tubular rail 21 in such a manner that any substantial pivotal movement is prevented when the spring is loaded. For this purpose the connecting strip 27 is provided with linear flange-like portions 30 adjacent the hook portions 29. The spring ends 20 are bent, if necessary, as shown at 31, so that the immediate end portions lie adjacent to or in engagement with a flange 30. By this arrangement pivotal movement of the ends of the springs in the hook portions 29 is prevented by abutment of the springs with flange portions 30. It will be noted that the strips 24 and 27 may be easily formed from sheet material and that the transverse edges of the eye portions 26 and hook portions 29 may be flared as shown to conform the portions to the shape of the spring wire ends.

Figs. 6 to 10 illustrate a spring cushion for the rear seat of an automobile which embodies features of the invention. The spring assembly is connected to a rigid frame 40 of any desired design. The frame 40 may include a tunnel 41 and to accommodate this the central portion 42 of the frame may be higher than the side sections 43. The rear of the frame may have arcuate side cutouts 44 to accommodate the rear wheel housings and, if desired, the forward transverse ends of the frame may be rounded as shown at 45. The frame 40 may also have a number of spaced longitudinal reinforcing struts 46.

The resilient surface of the seat is provided by a plurality of sinuous springs 50 in a parallel longitudinal relationship as best indicated by Fig. 6. These springs are formed in accordance with the aforementioned copending application of the present inventor and appear substantially identical to the springs 17 already described in connection with Figure 2. It will be realized that because of the cutout 44 and radius 45, the end springs 51 and 52 must be somewhat shorter than the majority of springs 50 and because of the tunnel 41 the center springs 53 have slightly less depth. However, each of the springs 50, 51, 52 and 53 is provided with a forward end portion, that is inclined or curved inwardly as shown at 54 and thence outwardly as shown at 55 to form an inwardly convex (substantially V-shaped) resilient support beneath the forward edge 56 of the resilient surface. Also, each of the springs 50, 51, 52 and 53 is provided with an inwardly curved rearward end portion 57, bent substantially parallel to the frame members 46 at the end thereof as shown at 58, to form a resilient support for the rearward edge 59 of the resilient surface. As is customary, the forward portion of each spring wire terminates in a straight transverse element 60 and the rearward portion of each opening in a transverse straight element 61. It is by means of these straight elements that the springs are attached in a desired predetermined and preformed position to forward and rearward transverse rails or spring supporting strips which are adapted to be fixedly connected to the frame 40.

Inasmuch as the center springs 53 are connected to the frame section 42 which is higher than the frame section 43 to which the rest of the springs are attached, a separate forward transverse supporting strip or member 62 is provided therefor which is of the same construction as the forward strips 63 for the other springs 50, 51, and 52. The rearward ends 61 of the springs 50 and 53 are attached to the rearward transverse strip 64 while the rearward ends of the border springs 51 and 52 are attached to the transverse strips 65.

Figure 10:
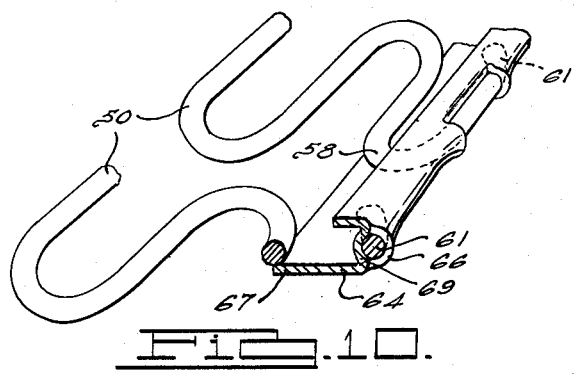
Fig. 10 is an enlarged perspective view taken on line 10—10 of Fig. 8.

All of the spring supporting strips 62, 63, 64 and 65, are preferably of the same construction and adapted in the same manner to receive the straight ends 60 and 61 of the springs. As best shown in Fig. 10, these strips preferably comprise angle sections having upstanding webs 66 and plane flanges 67 by which the rails may be welded or otherwise rigidly attached to the struts 46 or other parts of the frame 40. It will be noted that the web 66 is on the forward side of each strip (i. e., the side nearer the front of the cushion) so that each strip may be regarded as opening rearwardly. In order to receive the ends of the springs, the webs 66 of the rails are provided with a plurality of transversely spaced apertures 68 (Figs. 8 and 9) at least two being provided for the straight wire portions 60 and 61 of each spring end. The spring is assembled to the rails by passing the transverse end 60 or 61 forwardly through one aperture so that it is on the forward side of the web and then rearwardly through the second aperture so that the spring ends on the rearward side of the web. These apertures are conveniently formed in the web 66 of the rails by means of a stamping operation wherein transversely spaced portions 69 of the web 66 are deformed inwardly over the flange 67 and, if desired, the portions therebetween deformed outwardly. The portions are slit at the ends to provide forwardly presenting hook portions similar to eye and hook portions 26 and 29 of Figs. 2 and 4. The apertures 68 thus formed between the web section proper and the portions 69 are in planes normal to the web and are substantially coaxial with the ends 60 and 61 of the springs. The forward transverse strips 62 and 63 have the flanges thereof welded or otherwise rigidly attached to the frame 40 substantially beneath the forward edge 56 of the resilient surface. The rear strips 64 and 65 are spaced inwardly over the rearward edge 59 so that the resilient surface overhangs them. They may be welded in these positions or otherwise fixedly attached to the members 46 and other parts of the frame 40. Since, as previously described, the spring ends 58 are formed so as to be substantially parallel to or in engagement with the flanges 67 they prevent, by abutment therewith, pivotal movement of the springs with respect to the rails 64 and 65 when a load is applied to the resilient surface.

In order to prevent excessive bouncing, a transverse, upstanding, collapsible listing strip 70 is connected to the load-supporting portions of the springs and to the portions 54 thereof. This strip serves to fix the maximum distance between these portions of the springs. It may be formed of burlap material with the upper and lower edges bent around a rod of tougher material such as metal, rope, or paper. Hog rings 71 of a conventional type may be hooked around the edges of the strip and used to connect it to the respective portions of each spring.

If desired, a transverse pigtail comprising a coil spring 72 may be clamped to a central portion of each spring by means of clips 73 in order to distribute a load and limit movement of any individual spring.

As best illustrated in Fig. 6, a border rail 74 for the resilient surface is also provided. It is directly connected to the springs, however, only at the rear edge 59 and the cutout 44 where clips 75 of a conventional type are employed to clamp the springs thereto. The side or border springs 51 are preferably clamped by means of clips 76 to a side rail 77 which has an outwardly offset portion 78 that is clamped by a clip 79 to the side or longitudinal section of the border rail 74. If desired, the forward and rear edges of the spring 51 and the side rail 77 may be commonly connected by means of clips 80 to the portions of the border rail 74 which form the cutout 44 and the radius 45.

A thin flexible transverse strap 81 is used in lieu of the border rail for the forward edge 56 of the resilient surface so as to provide a soft edge and also to provide means for preventing tilting of the individual springs. The border rail 74 is clamped to the ends of the strap 81 by means of clips 82 and has longitudinal offsets 83 which are also clamped to the strap by means of clips 84. The forward side of the strap 81 has a slot 85 for each spring. A clip 86 extending therethrough and around a straight leg portion of each spring serves to clamp the springs to the strap. Preferably, the strap has an aperture 87 for each spring on the rearward side thereof which is located so as to be transversely spaced from the slot 85 and adjacent the base of a straight leg next to the one clamped to the strap by means of clips 86. Hog rings 88 may be looped through the apertures 87 and around the spring legs to clamp them to the strap. It will be recognized that since transversely and preferably also longitudinally spaced points on each spring are clamped to the strap 81 that tilting of the spring is substantially prevented.

Figure 12:
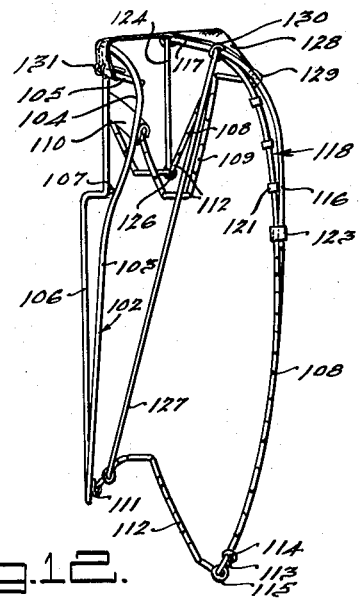
Fig. 12 is a sectional view taken along the line 12—12 of Fig. 11.
Figure 11:
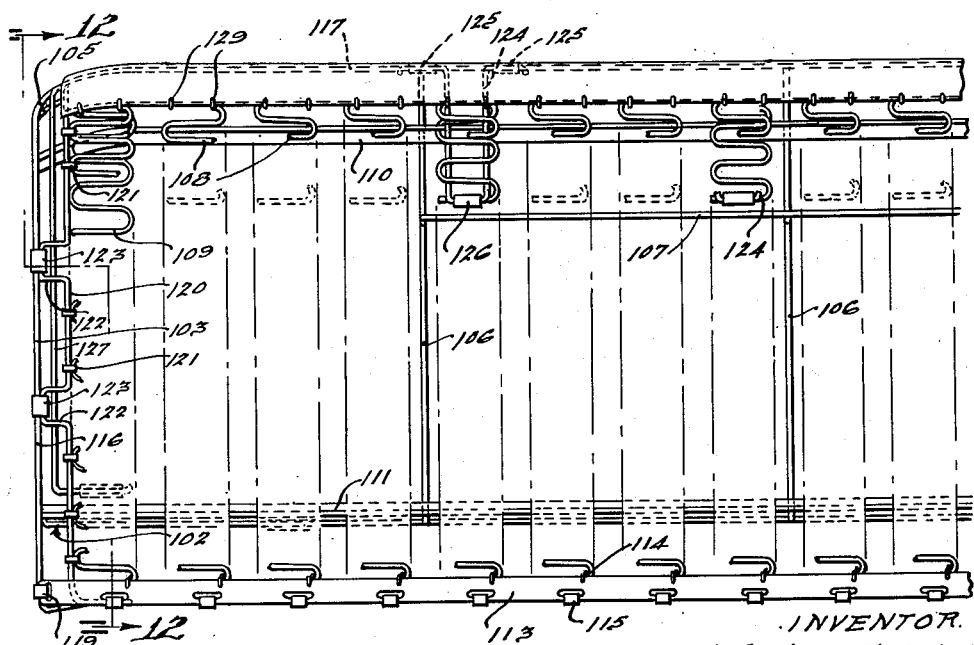
Fig. 11 is a view in elevation, with parts removed, of a back spring construction for automobiles embodying features of the invention.

A modified form of spring cushion construction, which is particularly suitable for back cushions of automobiles, is illustrated in Figs. 11 and 12. In this construction there is a frame which includes a continuous, rigid, wire element 102 of rectangular shape with side sections 103 that may be arcuately offset at 104 (Fig. 12) so that the top of the cushion has less depth than the bottom. An inwardly spaced transverse wire element 105 parallel to the top of the element 102, may be fixedly connected to the opposite side sections 103. Transversely spaced rigid reinforcement struts 106 with jogs therein may be used to fixedly interconnect the top and bottom sections of the frame wire 102. If desired, these may be interconnected by a transverse rod 107.

A plurality of parallel sinuous spring elements 108 with side or border springs 109 are mounted on the frame 102 by means of the upper and lower strips 110 and 111 which may be inwardly presenting angle strips adapted in the same manner as the strips 62, 63, 64 and 65, hereinbefore described, to receive the transverse straight end sections of the springs. The strips 110 and 111 are welded or otherwise suitably affixed to the frame 102. The springs 108 and 109 have their upper and lower ends 112 inwardly and thence outwardly curved beneath the resilient surface which they provide so as to form inwardly convex resilient supports therefor as heretofore described in connection with other forms of the invention.

The transverse border element for the lower edge of the resilient surface formed by the springs 108 and 109 comprises a thin, flexible strap 113, substantially identical to strap 81 heretofore described, which is clamped to transversely and longitudinally spaced points on each spring by means of the hog rings 114 and the clamps 115 in the manner shown for strap 81. The side or longitudinal border rails 116 and the upper rail 117 are continuous and form the border rail 118 which may be clamped in a suitable manner by the clips 119 to the ends of the strap 113. The side rails 116 are spaced from the border springs 109 and connected thereto through the medium of an intermediate rail 120 which is clamped by clips 121 to the border spring and has outwardly extending offset portions 122 which are connected to the rail 116 by clamps 123. The upper rail 117 is disposed between the convexly shaped resilient surface formed by the springs and the frame 102 and has transversely spaced, longitudinally extending, substantially U-shaped offsets 124 which may be formed in the rail or clamped thereto, as shown by clamps 125. The innermost portions of the offsets 124 are clamped to, preferably, the innermost sections of the upper inwardly curved end portions of the springs 108 by means of clips 126. Longitudinal side struts 127 may be employed to interconnect the front rail 117 and the lower end portions of the border springs 109.

It will be recognized that in the above construction there are no rigid rails at the upper and lower edges of the resilient surface, hence, they may be regarded as "soft" edges. The top edge is preferably connected to the frame by means of a transverse listing strip 128 which may be made of burlap. This is connected on one edge to the upper edge of the springs 108 and 109 (i. e., upper edge of the resilient surface) by means of hog rings 129 and passes around the front rail 117 to which it may be connected by hog rings 130, and underneath the upper edge of the frame 102 to be connected by hog rings 131 to the transverse frame member 105. It will be recognized that by means of these connections the strip 128 serves to limit the maximum distance between each spring and the frame 102.

The foregoing structure has been shown by way of illustration only and it is realized that various modifications may be made therein without departing from the spirit of the invention.

What is claimed is:

1. The combination of a sinuous spring made of wire bent back and forth to provide oppositely disposed loop portions joined by straight portions and a rigid member transverse to the spring, said rigid member having a plurality of transversely spaced apertures receiving an end straight portion of the spring and a flange extending in the direction of the springs and adjacent thereto to be engaged by the next adjacent straight portion of the spring to prevent pivotal movement of the spring toward said flange while permitting pivotal movement away therefrom.

2. In a spring cushion construction, the combination of a plurality of parallel sinuous springs providing a resilient surface and each having end portions projecting inwardly beneath the surface to provide a resilient support for the surface at the edge thereof, a flexible transverse strap at the edge of the surface, and means clamping each spring to the strap along the front edge of the resilient surface.

3. In a spring cushion construction, the combination of a plurality of parallel sinuous springs providing a resilient surface supported above a base, a flexible transverse strap at the front elevated edge of the surface, means clamping spaced points on each spring to the strap, a border wire encompassing the remaining side and rear edges of the surface and having offset end portions, means clamping the offset end portions of the border wire to the strap, and means clamping the wire at the side and rear edges of the springs forming said surface.

4. In a spring cushion construction, the combination of a plurality of parallel sinuous springs providing a resilient surface and each having the first end portions thereof inclined inwardly and thence outwardly beneath the surface to form an inwardly convex resilient support for a first transverse edge of the surface and the second end portions inwardly and downwardly inclined beneath the surface to provide a resilient support for a second transverse edge of the surface, a first rigid strip transverse to the springs and beneath the surface and having a plurality of transversely spaced apertures receiving the first end sections of the springs and a flange extending toward the second edge, and a second rigid strip transverse to the springs beneath the surface and spaced inwardly from the second edge and having a plurality of transversely spaced apertures receiving the second end sections of the springs and a flange extending toward the second edge, the second end sections of the springs being shaped to substantially lie on the flange of the second strip whereby substantial pivotal movement thereof in the apertures is prevented by abutment with the flange.

5. In a spring cushion construction, the combination of a plurality of parallel sinuous springs providing a resilient surface and each having end portions thereof inclined inwardly and thence outwardly beneath the surface to form an inwardly convex resilient support for the transverse edge of the surface, a base element to which said support is attached, said base element having stop means for limiting the movement of the support, and a transverse listing strip substantially normal to the surface interconnecting the surface and the convexly formed edge support interjacent its ends for positioning said support against said stop means.

6. In a spring cushion construction, the combination of a plurality of parallel sinuous springs providing a resilient surface and each having end portions thereof inclined inwardly and thence outwardly beneath the surface to form an inwardly convex resilient support for the transverse edge of the surface, and connecting means between the ends of the resilient surface and the central portion of the convex support to control the maximum spacing thereof while permitting deflection therebetween and on the lower portion of the convex support.

7. In a spring cushion construction separable from a seat support, the combination of a plurality of parallel sinuous springs providing a resilient surface and each having end portions thereof inclined inwardly beneath the surface to form a resilient support for the transverse edge of the surface, and a base rail for said resilient support at the rear edge thereof spaced beneath the transverse edge and inwardly thereof to have the edge overhang the base rail to provide a recess beneath the surface inwardly of the rear edge thereof.

8. In a spring cushion construction, the combination of a plurality of parallel sinuous springs providing a resilient surface and each having end portions thereof inclined inwardly beneath the surface to form inwardly resilient supports beneath the transverse edges of the surface, a base rail for said resilient support at the rear edge of the construction spaced beneath and inwardly of the rear transverse edge of the surface to provide a recess therebeneath, and means operatively connecting the base rail to the resilient support in a manner to retain the spring ends from pivoting when deflected.

9. In a spring cushion construction, the combination of a plurality of parallel sinuous springs providing a resilient surface and each having end portions thereof inclined inwardly and thence outwardly beneath the surface to form inwardly convex resilient supports for the transverse edges of the surface, rigid support members for the springs beneath said surface, means operatively connecting the spring ends to said members, connecting means between the convex resilient supports and the resilient surface interjacent the ends thereof to prevent the rocking of the inwardly convex resilient support of each spring independently of the deflection of the surface portions thereof.

10. In a spring cushion construction, the combination of a plurality of parallel sinuous springs providing a resilient surface and each having end portions thereof inclined inwardly and thence outwardly beneath the surface to form an inwardly convex resilient support for the transverse edge of the surface, connecting means between the resilient surface and the upper portion of the convex support forming a triangular configuration therewith which is supported on the lower portion of the convex support.

11. In a spring cushion construction, the combination of a plurality of parallel sinuous springs providing a resilient surface and each having the first end portions thereof inclined inwardly and thence outwardly beneath the surface to form an inwardly convex resilient support for a first transverse edge of the surface and the second end portions inwardly and downwardly inclined beneath the surface to provide a resilient support for a second transverse edge of the surface, a first rigid transverse support member operatively connected to the first ends of the springs, a second rigid transverse support member, means operatively connecting the second ends of the springs to the second member so as to prevent substantial pivotal movement of the spring ends under loads, connecting means between the resilient surface and the upper portion of the convex support providing a fixed maximum distance therebetween and positioning the convex support on the member.

NICHOLAS WOLOFSKI.

References Cited in the file of this patent

UNITED STATES PATENTS

| Number | Name | Date |
|---|---|---|
| 2,063,780 | Ball | Dec. 8, 1936 |
| 2,117,748 | Stewart | May 17, 1938 |
| 2,133,611 | Freund | Oct. 18, 1938 |
| 2,185,036 | Menge | Dec. 26, 1939 |
| 2,186,548 | Lotz | Jan. 9, 1940 |
| 2,214,136 | Hopkes | Sept. 10, 1940 |
| 2,244,469 | Menge | June 3, 1941 |
| 2,248,093 | Kronheim et al. | July 8, 1941 |
| 2,285,827 | Neely | June 9, 1942 |
| 2,293,566 | Shanahan | Aug. 18, 1942 |
| 2,332,041 | Asaro | Oct. 19, 1943 |
| 2,364,499 | Wolofski | Dec. 5, 1944 |
| 2,407,933 | Neely | Sept. 17, 1946 |
| 2,526,183 | Williams et al. | Oct. 17, 1950 |
| 2,542,458 | Bank | Feb. 20, 1951 |
| 2,568,829 | Scott et al. | Sept. 25, 1951 |
| 2,591,185 | Neely | Apr. 1, 1952 |
| 2,593,831 | Bank | Apr. 22, 1952 |